United States Patent [19]
Werntz

[11] 3,877,565
[45] Apr. 15, 1975

[54] PRESSURE FREE ARTICLE CONVEYOR
[75] Inventor: Charles W. Werntz, Ferguson, Mo.
[73] Assignee: Alvey Inc., St. Louis, Mo.
[22] Filed: Jan. 3, 1974
[21] Appl. No.: 430,259

Related U.S. Application Data
[63] Continuation of Ser. No. 183,981, Sept. 27, 1971.

[52] U.S. Cl. ............................................ 198/127 R
[51] Int. Cl. ............................................ B65g 13/02
[58] Field of Search .................................. 198/127

[56] References Cited
UNITED STATES PATENTS
3,643,788    2/1972   Werntz............................ 198/127 R
FOREIGN PATENTS OR APPLICATIONS
1,481,291    2/1967   Germany.......................... 198/127 R Primary Examiner—Evon C. Blunk
Assistant Examiner—Joseph E. Valenza
Attorney, Agent, or Firm—Gravely, Lieder & Woodruff

[57] ABSTRACT

A pressure free article conveyor in which article supporting rollers and a continuously moving drive belt are spaced apart, article sensing means distributed among the rollers so that the rollers are divided into groups, and means operative between the drive belt and each group of rollers to connect or disconnect the drive belt and rollers without having to move or displace the drive belt. The operative means between the drive belt and the article supporting rollers consists of drive transfer wheel means constantly engaged on belt power take-off roller means, and means responsive to the article sensing means to displace the drive transfer wheel around a portion of the periphery of the power take-off roller means to make and break contact with the article supporting roller.

5 Claims, 6 Drawing Figures

FIG.6

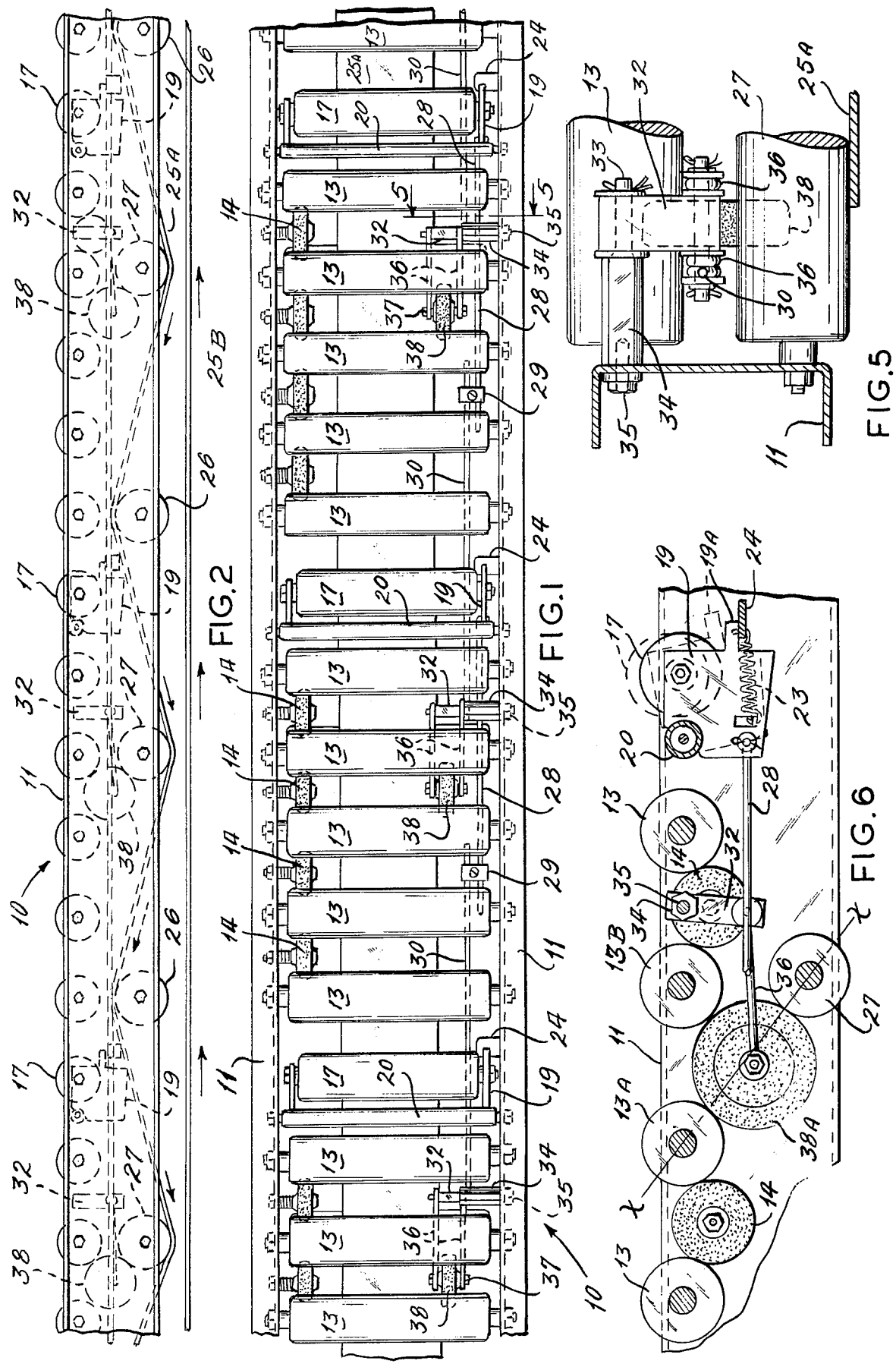

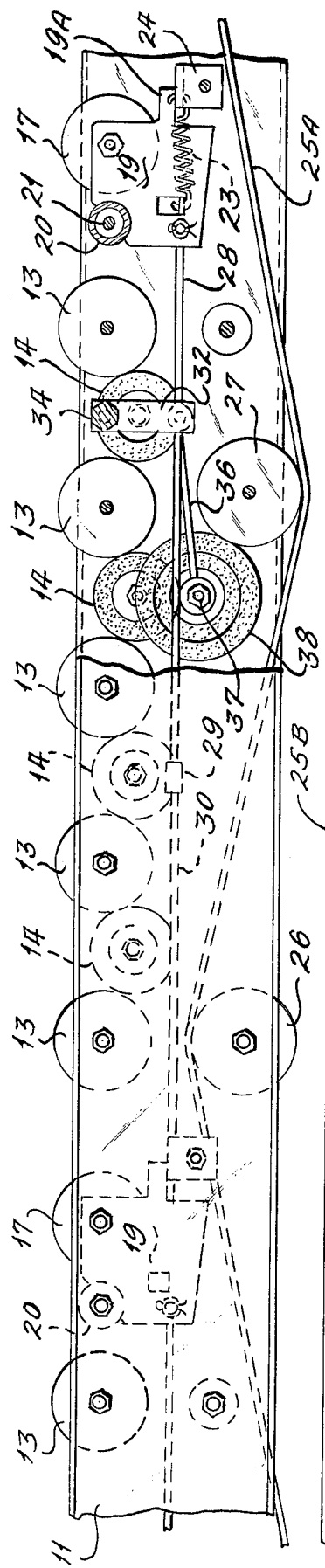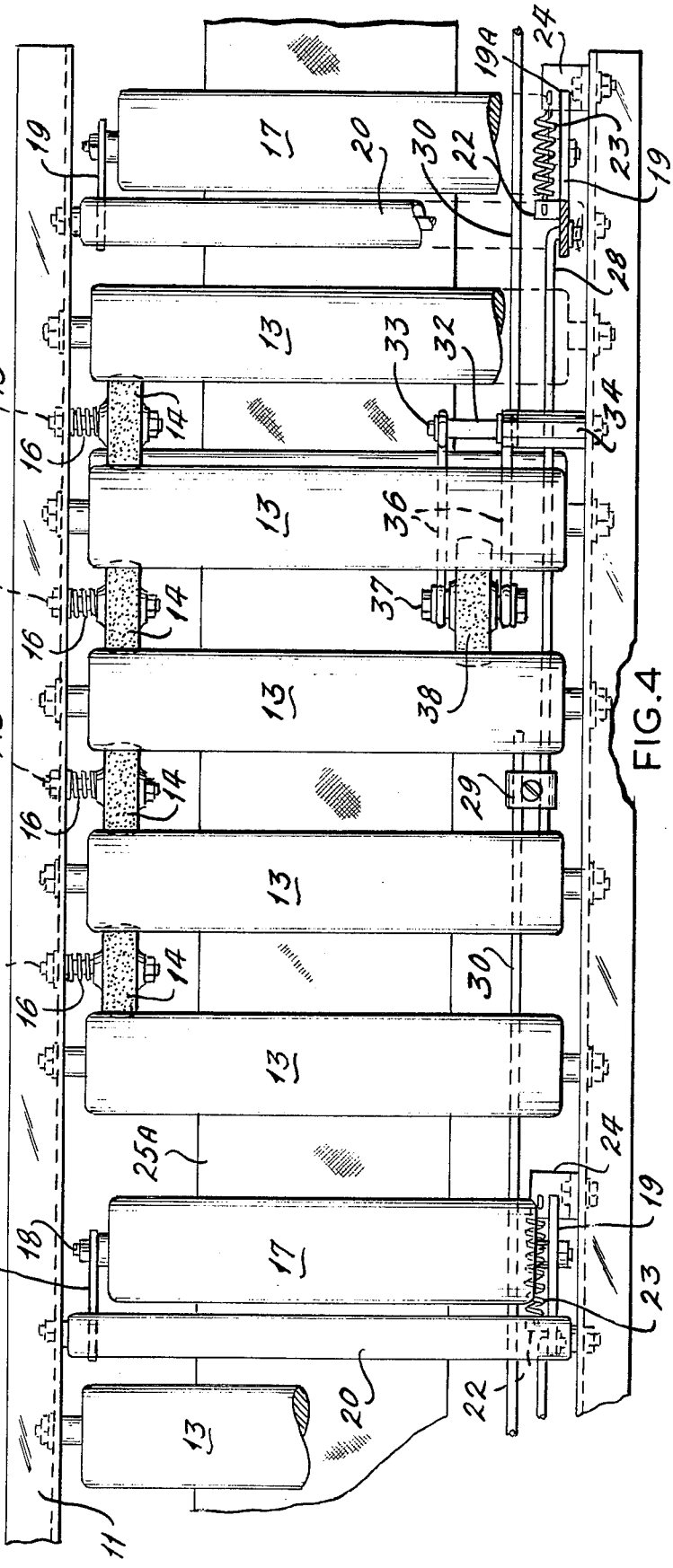

PRESSURE FREE ARTICLE CONVEYOR

This is a continuation of my application Ser. No. 183,981, filed Sept. 27, 1971.

BRIEF SUMMARY OF THE PRESSURE FREE ARTICLE CONVEYOR

This invention pertains to improvements in article conveyors and especially to the components of the conveyor by which the conveyance of articles is controlled in a pressure-free manner.

The character of the conveyance for articles is an important part of the business of keeping the mass production or packaging of articles from ganging up on a conveyor at certain times and pressing together due to continued power delivery to the rollers of the conveyor. An even flow of articles, with due allowance for momentary hang-up, is greatly to be desired, and the present conveyor is operative with that desirable objective in mind.

A preferred embodiment includes an arrangement of load supporting rollers defining an article conveying surface, article sensing rollers or feelers disposed at spaced locations in the conveying surface to sense the presence of the articles and also to sense the condition if a leading article remains in one location without appreciable advancement, and control means governed by the article sensing rollers or feelers to connect or disconnect the power to load supporting rollers, whereby articles being conveyed will be prevented from ganging up on a lead article that may have blocked the flow. The control means is preferrably arranged to be stationed at predetermined locations along the length of the conveyor surface so that progressively more and more of the conveyor rollers supporting the articles trailing a lead article that is stuck or hung-up will be disconnected from the power source. While the power to the rollers is cut off progressively, roller group by roller group back of a stationary article, the reconnection of power is progressively established by energizing the first group of rollers to be stopped and proceeding backwardly from there, so that a suitable space is developed or maintained between the articles as each resumes its forward motion.

BRIEF DESCRIPTION OF THE DRAWINGS

Certain preferred embodiments of the present conveyor have been illustrated in the accompanying drawings, wherein:

FIG. 1 is a plan view of a portion of a conveyor assembly in which the components and parts thereof are shown;

FIG. 2 is a longitudinal side elevation view of the assembly seen in FIG. 1;

FIG. 3 is a greatly enlarged longitudinal elevational view with portions broken away to show a common detail of the assembly shown in FIG. 2;

FIG. 4 is a greatly enlarged plan view of the assembly seen in FIG. 3;

FIG. 5 is a fragmentary sectional view seen at line 5—5 in FIG. 1; and

FIG. 6 is a view similar to FIG. 3, but showing a modified arrangement for the assembly.

DESCRIPTION OF THE CONVEYOR

In the views of FIGS. 1 and 2 the conveyor assembly 10 comprises a pair of channel side rails 11 with the flanges directed outwardly so that the vertical webs are in opposed spaced relation. The side rails 11 are retained in parallel relation by a plurality of spacer members (not shown) of usual construction which are distributed along the length of the rails. A plurality of load carrying rollers 13 are evenly spaced along the conveyor side rails 11, and these rollers are suitably connected to the rail webs in position such that the top surfaces project above the side rails to define a load conveying surface for the movement of articles which in the view of FIG. 2 is from left to right.

The load carrying rollers 13 are arranged in groups for rotation in unison by a plurality of intervening friction wheels 14. The friction wheels 14 are mounted on axles 15 (FIG. 4), and each axle is secured to a common side rail 11 so that the wheels frictionally engage a pair of rollers 13. Each wheel 14 is yieldably stabilized in its operating drive position by spring means 16 so as to prevent wobble thereof.

In the conveyor 10 every sixth roller 17 (see FIG. 1) is specially mounted so that it can function as an article position sensing means. For this purpose each sensing roller has its axle 18 mounted in and between a pair of plates 19, and these plates (FIG. 4) are secured to a common torque tube 20 which is rotatably mounted on shaft 21 secured at its ends in the opposed side rails 11. In this manner the ends of the sensing roller are constrained to move in a vertically directed arc about the axis of shaft 21. The general motion of each sensing roller 17 is vertical so it may project above the line of the article engaging surfaces of the intervening rollers 13 when in sensing positions and may be forced downwardly as an article engages and passes over the roller. One of the plates 19 is formed with a tab 22 (FIG. 4) struck therefrom at right angles to provide an anchor for one end of a tension spring 23, the opposite end of the spring 23 is anchored in a bracket element 24 mounted on the adjacent side rail 11 (FIG. 4). Each sensing roller 17 is similarly provided with a tension spring 23 so that each roller 17 is normally moved to its elevated position about the intervening group of rollers 13. Each spring 23 is chosen in relation to the weight of the associated sensing roller 17 to lift the roller 17 until it is checked by a friction drive wheel as will be explained presently. Since the springs 23 hold the respective rollers 17 in elevated position, it follows that an article moving along the conveyor engages each roller 17 and will depress the same only sufficiently to allow passage of the article, but excessive depression will be prevented by stop finger 19A striking on the spring anchor bracket element 24.

The power for rotating the load carrying rollers 13 is obtained from a belt having its driving pass 25A directed over idler rollers 26 spaced along and between the side rails 11, and under the power take-off rollers 27 also spaced along and between the side rails 11. The return pass 25B of the belt is located below its drive pass 25A in a manner well known in the conveyor art. The belt drive pass 25A is spaced below the rollers 13 so there is no direct contact and neither is the belt raised and lowered.

The drive from the belt 25A and its drive rollers 27 to the load supporting rollers 13 is obtained in the following manner: Beginning at the right hand end of the conveyor 10 of FIGS. 1, 3 and 4, it can be seen that the plate 19 to which the tension spring 23 is operatively connected is engaged by one end of a push-pull rod 28, the opposite end of the rod 28 being connected adjustably by a clamp device 29 to the end of a push-pull rod extension 30. The opposite end of the extension rod 30 is pivotally connected (FIG. 5) to the lower end of an idler link 32. The upper end of the idler link 32 is mounted on a pivot shaft 33 which is at the outer end of a shaft body 34, mounted in cantilevered fashion from the adjacent side rail 11 by a suitable machine screw 35. The lower end of the idler link 32 is also connected to a pair of links 36, and the opposite ends of these links 36 are connected to the respective ends of an axle 37 for a friction drive transfer wheel 38.

The drive transfer wheel 38 (FIG. 3) rides in constant engagement on the power take-off roller 27 driven by belt 25A, thus obtaining its rotary drive energy from the roller 27. Each drive transfer wheel 38 is caused to roll along the periphery of its associated power take-off roller 27 by the motion derived through the links 36, idler link 32, and push-pull rods 28 and 30 connected to a sensing roller support plate 19. In this assembly of components, as each of the sensing rollers 17 moves to its elevated position by the spring 23, the associated plate 19 and connected push-pull rods 28 and 30 swing the idler link 32 in a counter clockwise sense, and this movement pulls the links 36 rightwardly (FIG. 3) to cause the drive transfer wheel 38 to roll upwardly on the power take-off roller 27. The upward shift of drive transfer wheel 38 brings it into frictional drive contact with the adjacent load carrying roller 13 directly above the take-off roller 27, thereby limiting the upward motion of sensing roller 17 and transferring the drive power to this roller 13. Since this roller 13 is coupled to the other rollers 13 of the group between sensing rollers 17 by contact with friction wheels 14 all of the rollers 13 of the groups are simultaneously driven for advancing each article along the conveyor 10.

It will be observed that the upward arcuate movement of the sensing roller 17 is checked when the drive transfer wheel 38 engages a roller 13 to drive the roller 13, there being five such rollers in each group. Depression of the sensing roller 17 is checked by the stop 19A engaging the fixed bracket 24 to which one end of the spring 23 is engaged. The depression of the sensing roller 17 disconnects the drive transfer wheel 38 from the associated roller 13 and the rollers 13 of that group are effectively disconnected from the drive pass 25A of the belt.

From the foregoing description it can now be understood that with no articles on the conveyor 10, and with power applied to the belt 25A from a drive motor (not shown), each sensing roller 17 will be in its elevated position due to the tension of the respective springs 23. This raised positioning of all sensing rollers 17 will cause the drive transfer wheels 38 to transfer power from the belt 25A and power take-off rollers 27 to the load supporting rollers 13, and all rollers 13 will rotate under power. When articles are placed or fed onto the conveyor 10 from the left hand end (FIG. 2) each article will be caused to move rightwardly. Each article during its advance will engage the elevated sensing rollers 17 in sequence. This action will momentarily disconnect the drive to the trailing group of rollers 13 so that a space is maintained between each article. When the lead article releases the depressed sensing roller 17 the drive to the trailing group of rollers 13 will be reestablished to advance the next trailing article. This sequence of drive and disconnection of drive to groups of rollers 13, one group downstream of each sensing roller 17, will occur along the length of the conveyor 10 so that the articles are conveyed in spaced relation.

Should a leading article meet with an obstruction so it cannot advance or should it be purposely stopped, such obstructed article will hold the sensing roller depressed over which it is located at that time. This action will cut off power to a trailing group of rollers 13 to stop the advance of the next trailing article, thereby preventing the trailing article from bumping into the obstructed article. It is noted that the rollers 13 directly under an obstructed article will continue to be powered, thereby providing the conveyor with a way of resuming conveyance when the obstructed article is free to move on. This power cut-off will progressively proceed backwardly from the obstructed article and progressively stop the advance of successive trailing articles will be prevented from pressing against, crushing or damaging the obstructed article. A conveyor built according to the foregoing description has been found to move articles without damaging or objectionable pressure contact therebetween so that no damage will occur by reason of the cut off of power to trailing articles. This conveyor has the great advantage of operating to convey articles or cases containing crushable goods free of damage in the event a leading article or case is obstructed or purposely stopped.

Referring now to the modification of FIG. 6, it will be noted that the following description will refer to the components by the same reference numerals, where possible, as used in the description of the preferred embodiment of FIGS. 1 to 5. In the modified assembly (only one being shown) the drive transfer wheel 38A is arranged to drivingly engage a pair of adjacent load supporting rollers 13A and 13B directly thereabove. In this arrangement a friction wheel 14 adjacent the wheel 38A is eliminated as the wheel 38A is sufficient to power both rollers 13, thereby effecting a power transfer to the entire group of rollers. In this modification the wheel 38A may be larger in diameter than the wheel 38 of FIG. 3 as it must make contact with three rotary members, and its axis of rotation must be prevented from reaching or passing through a line X—X connecting the axis of the drive roller 27 and the left hand one of the load supporting roller 13A. This limitation is maintained by having wheel 38 engage rollers 13A and 13B before the axis of wheel 38 reaches the line X—X. It is also noted that by employing a larger diameter wheel 38 its movement on the periphery of the power roller 27 will follow a more vertical path of movement than is the case of the wheel 38 of FIG. 3, thereby assuring contact with both rollers 13A and 13B while not breaking contact with the power take-off roller 27. The modified assembly of FIG. 6 is, of course, employed in spaced relation along the conveyor length and functions in the manner described for the preferred embodiment. When the drive transfer wheel 38A engages rollers 13A and 13B, the roller 13B engages a friction wheel 14 to drive the next roller 13, and the roller 13A engages an adjacent friction wheel 14 to drive the next roller 13. Thus, sufficient friction wheels 14 are provided to drive a group of article supporting rollers 13 on either side of rollers 13A and 13B.

In the foregoing specification it is understood that reference to article shall also include any reasonable character of object that can be conveyed. Also, no limitation is to be inferred by reason of the number of the number of rollers assigned to each group, as this may be changed to suit the size of the objects being conveyed.

What is claimed is:

1. In an article conveyor having longitudinally spaced article carrying rollers, article sensing roller means normally projected above a predetermined group of said article carrying rollers to form the latter rollers into groups spaced along the conveyor, drive means operable along a fixed path spaced from said groups of article carrying rollers, a power take-off drive roller for each of said groups of article carrying rollers, each of said power take-off rollers being fixed in position so as to be constantly engaged with said drive means, a drive transfer wheel for each power take-off drive roller, link means connected to each of said drive transfer wheels and acting to hold said latter wheels in position to bear by gravity upon an adjacent power take-off drive roller, said drive transfer wheels being movable along the periphery of each power take-off drive roller into and out of frictional engagement with at least one of the rollers of a group of article carrying rollers adjacent said drive transfer wheel to rotate said one roller of the group, friciton wheels engaged between said article carrying rollers in each group to drive said rollers from said one roller of the group of article carrying rollers, and actuating means operably connected between a sensor roller and said link means to pull said drive transfer wheel in a direction along the periphery of the adjacent power take-off drive roller and into a position for driving a trailing upstream group of article carrying rollers, said actuating means and the connected link means being effective upon the depression of any one sensing roller by an article engaging the same to allow said associated drive transfer wheel to move in a direction disengaging said drive transfer wheel from driving the trailing group of article carrying rollers by moving said drive transfer wheel along the periphery of the engaged power take-off roller to a position out of fricitonal contact with the article carrying roller of said trailing group of article carrying rollers.

2. The article conveyor of claim 1 wherein said actuating means comprise push-pull means interconnecting a sensor roller with a drive transfer wheel spaced one group of article carrying rollers upstream form the group of rollers adjacent said latter sensing roller location in said series of article carrying rollers, and resilient means positioning each sensing roller in normally projected position and moving the interconnected drive transfer wheel along the periphery of said engaged power take-off roller into frictional drive operation with said at least one of the article carrying rollers adjacent said drive transfer wheel.

3. In an article conveyor having a continuous span of article supporting rollers arranged in groups and a roller drive belt spaced from the roller groups and movable along a fixed path, the improvement of a plurality of belt power take-off roller means spaced along the conveyor span between said belt and each of the groups of supporting rollers, each belt powered take-off roller having a fixed position engaged on said belt, a drive transfer wheel constantly bearing by gravity upon the periphery of the adjacent take-off roller and movable between a first position spaced from an adjacent group of article supporting rollers and a second position in driving engagement with the latter group of rollers; article sensing means spaced along the span of the conveyor between said groups of said article supporting rollers; separate linkage means operatively connecting one of said sensing means with one of said drive transfer wheels; and separate resilient means connected to and normally yieldingly pulling each of said linkage means into a position corresponding to said second position allowing the connected one of said drive transfer wheels to drive said group of rollers, and said sensing means responding to the movement thereover of each article on the conveyor span to momentarily and sequentially actuate said connected linkage means against said resilient means for moving said drive transfer wheel to said first position to interrupt the drive to said group of rollers, said resilient means restoring said drive transfer wheel to said second position upon passage of the articles.

4. In an article conveyor the combination which comprises: longitudinally spaced article carrying rollers; article sensing roller means spaced along said conveyor and each being related to an adjacent group of said article carrying rollers located immediately upstream thereof; separate motion controlling means connected to each sensing roller means and normally projecting said sensing roller means above the rollers of its adjacent upstream group; drive means operable along a fixed path spaced below all of said groups of article carrying rollers; a power take-off drive roller for each of said groups of article carrying rollers, each of said power take-off drive rollers being fixed in position so as to be constantly engaged with said drive means; a drive transfer wheel bearing by gravity upon each power take-off drive roller and movable along the periphery thereof into and out of frictional engagement with at least one of the rollers of a group of article carrying rollers adjacent said drive transfer wheel to rotate said one roller of the group; friction wheels engaged between said article carrying rollers of each group to rotate said rollers of the group upon rotation of said one roller; and separate actuating means operably connecting each of said motion controlling means for each of said article sensing roller means to a drive transfer wheel for the next trailing upstream group of article carrying rollers, said separate actuating means, solely upon its article sensing roller means being depressed from its normally projecting position by an article moving on said article carrying rollers and independent of the position of any other sensing roller means, forcing said drive transfer wheel of the next trailing upstream group of article carrying rollers to move by gravity on the periphery of the power take-off drive roller to a position out of frictional engagement with said at least one of the rollers of said trailing upstream group, whereby the transfer of power from said adjacent power take-off drive roller is broken.

5. The article conveyor combination of claim 4 wherein each of said separate actuating means includes push-pull linkage connected to one of said motion controlling means, an idler element supporting said linkage remote from said one motion controlling means, and link means extending from said idler element to one of said drive transfer wheels to maintain the latter wheel in constant gravitational engagement on one of said drive rollers.

* * * * *